(12) United States Patent
Tanaka et al.

(10) Patent No.: US 12,473,464 B2
(45) Date of Patent: Nov. 18, 2025

(54) THERMAL ADHESIVE LAMINATED ORIENTED FILM

(71) Applicant: TOYOBO CO., LTD., Osaka (JP)

(72) Inventors: Yoshitaka Tanaka, Inuyama (JP); Shigeyuki Watanabe, Otsu (JP); Nobuhiro Yoshimura, Otsu (JP); Ryo Umeki, Otsu (JP); Takafumi Masuda, Takasago (JP); Daiki Funaoka, Nagoya (JP)

(73) Assignee: TOYOBO CO., LTD., Osaka (JP)

( * ) Notice: Subject to any disclaimer, the term of this patent is extended or adjusted under 35 U.S.C. 154(b) by 378 days.

(21) Appl. No.: 18/255,742

(22) PCT Filed: Nov. 11, 2021

(86) PCT No.: PCT/JP2021/041524
§ 371 (c)(1),
(2) Date: Jun. 2, 2023

(87) PCT Pub. No.: WO2022/137867
PCT Pub. Date: Jun. 30, 2022

(65) Prior Publication Data
US 2024/0002700 A1    Jan. 4, 2024

(30) Foreign Application Priority Data

Dec. 24, 2020 (JP) ................. 2020-215181

(51) Int. Cl.
| | | |
|---|---|---|
| *C09J 7/35* | (2018.01) | |
| *B32B 27/08* | (2006.01) | |
| *B32B 27/32* | (2006.01) | |
| *B32B 27/34* | (2006.01) | |

(52) U.S. Cl.
CPC ............. *C09J 7/35* (2018.01); *B32B 27/08* (2013.01); *B32B 27/32* (2013.01); *B32B 27/34* (2013.01); *B32B 2270/00* (2013.01); *B32B 2307/30* (2013.01); *B32B 2405/00* (2013.01); *C09J 2301/124* (2020.08); *C09J 2301/304* (2020.08); *C09J 2301/312* (2020.08); *C09J 2423/006* (2013.01); *C09J 2477/006* (2013.01)

(58) Field of Classification Search
CPC .. C09J 7/35; C09J 2301/124; C09J 2301/304; C09J 2301/312; C09J 2423/006; C09J 2477/006; B32B 27/08; B32B 27/32; B32B 27/34; B32B 2270/00; B32B 2307/30; B32B 2405/00
See application file for complete search history.

(56) References Cited

U.S. PATENT DOCUMENTS

| | | |
|---|---|---|
| 5,686,173 A | 11/1997 | Fujii et al. |
| 2019/0001634 A1 | 1/2019 | Takei et al. |
| 2020/0282701 A1 | 9/2020 | Yoshimura et al. |
| 2022/0081598 A1 | 3/2022 | Iwashita et al. |
| 2024/0286394 A1* | 8/2024 | Tanaka .................... B32B 27/32 |

FOREIGN PATENT DOCUMENTS

| | | |
|---|---|---|
| EP | 0967073 A2 | 12/1999 |
| JP | H03-224735 A | 10/1991 |
| JP | H06-155684 A | 6/1994 |
| JP | 2530732 B2 | 9/1996 |
| JP | H09-029908 A | 2/1997 |
| JP | 2000-079669 A | 3/2000 |
| JP | 2009-083478 A | 4/2009 |
| JP | 2013-185051 A | 9/2013 |
| JP | 2017-036354 A | 2/2017 |
| JP | 6331468 B2 | 5/2018 |
| WO | WO 2019/078134 A1 | 4/2019 |
| WO | WO 2020/145239 A1 | 7/2020 |

OTHER PUBLICATIONS

Japan Patent Office, International Search Report in International Patent Application No. PCT/JP2021/041524 (Jan. 18, 2022).

* cited by examiner

*Primary Examiner* — Blaine Copenheaver
(74) *Attorney, Agent, or Firm* — Leydig, Voit & Mayer, Ltd.

(57) ABSTRACT

The invention provides a thermal adhesive laminated oriented film containing a substrate layer comprising a resin composition containing 99.9 to 60% by mass of a polyamide resin or a polymethylpentene resin and 0.1 to 40% by mass of a modified polyolefin resin; and a thermal adhesive layer containing a thermal adhesive polyolefin resin and provided on each of both surfaces of the substrate layer so as to be in direct contact therewith by coextrusion. When a machine direction is defined as an X axis, a transverse direction is defined as a Y axis, and a thickness direction is defined as a Z axis, the film is stretched and oriented in at least one direction of the X axis or the Y axis, and has a thermal deformation rate at 150° C. of 4% or less in both directions of the X axis and the Y axis.

15 Claims, No Drawings

THERMAL ADHESIVE LAMINATED ORIENTED FILM

TECHNICAL FIELD

The present invention relates to a thermal adhesive laminated oriented film in which a thermal adhesive layer is provided on each of both surfaces of a substrate layer, and a roll obtained by winding the film.

BACKGROUND ART

A thermal adhesive film or sheet is a laminated body in which a thermal adhesive layer is provided on the outermost surface of at least one side of a substrate, and is used for various applications for purposes of packaging and reinforcing and the like in a method in which a thermal adhesive layer is bonded to an adherend made of a resin or a metal. The substrate is selected according to the purposes, but a resin substrate is often used, and an appropriate resin is selected according to required characteristics.

In order to obtain an excellent adhesion force to the adherend, not only an adhesion force between the adherend and the thermal adhesive layer but also a high adhesion force between the substrate and the thermal adhesive layer is required. This is because a region having the weakest adhesion force against an external stress tearing the whole is broken or peeled off.

In general, in order to obtain an excellent adhesion force between a substrate and a functional layer such as a thermal adhesive layer, a method is known, in which the surface of the substrate is activated by corona treatment or plasma treatment or the like, or an easily adhesive layer is provided on the surface of the substrate.

For example, in Patent Document 1, a method is described, in which strong adhesion to a thermal adhesive layer is obtained by providing an easily adhesive layer containing an acrylic polymer and a crosslinking agent on a substrate. In this regard, the appropriate use of a polyester resin as the substrate is described.

In Patent Document 2, an intermediate layer provided between a thermal adhesive layer and a substrate, and polypropylene, metallocene-based polyethylene, and metallocene-based polypropylene as resin materials of the intermediate layer are described. The use of a polyolefin polymer is disclosed as the substrate.

Meanwhile, when adhesion between a thermal adhesive layer and a substrate is high, a method is known, in which resins constituting both the thermal adhesive layer and the substrate are coextruded to produce a laminated body in which both the thermal adhesive layer and the substrate are laminated so as to be in direct contact with each other.

For example, Patent Document 3 describes that a substrate layer and a thermal adhesive layer are laminated by coextrusion to produce an unstretched thermal adhesive laminated body when a thermal adhesive laminated body used for metal lamination is produced.

Patent Document 4 describes a laminated body including a substrate made of a polypropylene film, a thermal adhesive layer on one surface of the substrate, and a polyolefin layer having a high melting point on the opposite surface, and a method in which the polypropylene substrate layer and the polyolefin layer are coextruded, and then stretched to extrude and laminate the thermal adhesive layer on the substrate side.

PRIOR ART DOCUMENTS

Patent Documents

Patent Document 1: WO2019/078134
Patent Document 2: JP-A-2017-36354
Patent Document 3: JP-B-6331468
Patent Document 4: JP-B-2530732

SUMMARY OF THE INVENTION

Problems to be Solved by the Invention

However, when the polyester is used as the substrate in the invention of Patent Document 1, a carbonyl group is easily hydrolyzed in a more severe moist-heat environment, and therefore the durability of the substrate in a moist-heat environment is limited. Since a step of providing the easily adhesive layer on the substrate is required, the step becomes complicated and is disadvantageous in terms of cost. The same applies to Patent Document 2 in which the intermediate layer is provided.

Patent Document 3 discloses that the substrate layer and the thermal adhesive layer of the thermal adhesive laminated body are formed by coextrusion, but the laminated body is an unstretched laminated body film, and therefore the laminated body is apt to have insufficient mechanical characteristics and disadvantageously makes it difficult to efficiently provide a larger product area.

Furthermore, Patent Document 4 discloses that the two layers are coextruded and then stretched, but the thermal adhesive layer is further extruded and laminated on the substrate side, and the thermal adhesive layer is not coextruded together with the substrate layer. For this reason, adhesion between the thermal adhesive layer and the substrate layer is apt to be insufficient, and a problem due to a difference in physical properties of the layers provided on both surfaces of the substrate layer is also apt to occur. When the thermal adhesive laminated body which is stretched after coextrusion is thermally bonded to an adherend, the positional deviation of bonding or the like is apt to occur. Furthermore, since the substrate is the polypropylene film, the mechanical properties at high temperature may be insufficient.

Therefore, an object of the present invention is to provide a thermal adhesive laminated oriented film having sufficient mechanical properties, having high durability in a moist-heat environment and high adhesion at a lamination interface, and having a good bonded state during thermal bonding, and a roll obtained by winding the film.

Means for Solving the Problems

As a result of intensive studies to solve the above problems, the present inventors have found that the above problems can be solved by adding a component for enhancing adhesion with a thermal adhesive layer to a resin having high durability in a moist-heat environment as a substrate layer, and coextruding the thermal adhesive layer to each of both surfaces of the substrate layer, followed by stretching, and have completed the present invention.

That is, the present invention includes the following contents.

[1] A thermal adhesive laminated oriented film including: a substrate layer comprising a resin composition containing 99.9 to 60% by mass of a polyamide resin or a polymethylpentene resin and 0.1 to 40% by mass of a modified polyolefin resin; and a thermal adhesive layer containing a thermal adhesive polyolefin resin and provided on each of both surfaces of the substrate layer so as to be in direct contact therewith by coextrusion, wherein when a machine direction is defined as an X axis, a transverse direction is defined as a Y axis, and a thickness direction is defined as a Z axis, the film is stretched and oriented in at least one direction of the X axis or the Y axis, and has a thermal deformation rate at 150° C. of 4% or less in both directions of the X axis and the Y axis.

[2] The thermal adhesive laminated oriented film according to [1], wherein the film has a storage elastic modulus at 150° C. of 50 MPa or more and a breaking strength of 50 MPa or more in at least one direction of the X axis or the Y axis.

[3] The thermal adhesive laminated oriented film according to [1] or [2], wherein the thermal adhesive layer provided on each of both the surfaces has a thickness of 10 μm or more and 100 μm or less, and a difference in birefringence index between the thermal adhesive layers on both the surfaces is 0.0001 or less.

[4] The thermal adhesive laminated oriented film according to any one of [1] to [3], wherein the film is oriented in two directions of the X axis and the Y axis by sequential or simultaneous biaxial stretching.

[5] The thermal adhesive laminated oriented film according to any one of [1] to [4], wherein the resin composition contains 85 to 65% by mass of the polyamide resin and 15 to 35% by mass of a modified polypropylene resin, the polyamide resin has a relative viscosity of 2.4 to 3.2 as measured in 96% sulfuric acid, and the modified polypropylene has an acid value of 1.0 to 3.5 mgKOH/g.

[6] The thermal adhesive laminated oriented film according to any one of [1] to [5], wherein the thermal adhesive polyolefin is obtained by modifying a mixture of a plurality of polyolefins having a melting peak temperature of 100° C. to 165° C. as measured by DSC with an acid anhydride, has an acid anhydride content of 0.1 to 3% by mass and an MFR of 1 to 30 g/10 min as measured under a load of 2.16 kg at 230° C., and an extracted amount of a low-molecular-weight component having a number average molecular weight of 1000 or less by acetone is less than 1% by mass.

[7] A roll obtained by winding the thermal adhesive laminated oriented film according to any one of [1] to [6] in a machine direction.

Effect of the Invention

The present invention can provide a thermal adhesive laminated oriented film having sufficient mechanical properties, having high durability in a moist-heat environment and high adhesion at a lamination interface, and having a good bonded state during thermal bonding, and a roll obtained by winding the film.

Details of the reason are unknown, but it is considered as follows. When a resin composition containing a polyamide resin or a polymethylpentene resin and a modified polyolefin resin is used as a substrate layer, the durability in a moist-heat environment can be improved, and affinity of the substrate layer with a thermal adhesive layer containing a polyolefin resin is also improved, so that the substrate layer and the thermal adhesive layer are coextruded so as to be in direct contact with each other. By coextruding the thermal adhesive layer onto each of both surfaces of the substrate layer, high adhesion is obtained at the lamination interfaces of both surfaces of the substrate layer due to the wettability and affinity of the thermal adhesive resin in a molten state.

Furthermore, by stretching and orienting an unstretched laminated body, not only productivity can be enhanced, but also mechanical properties can be improved. By adjusting the thermal shrinkage property and mechanical strength of the stretched thermal adhesive laminated oriented film, the deflection of the substrate layer due to heat during bonding of an adherend and wrinkles due to the shrinkage of the substrate layer can be suppressed, and defects during bonding can be eliminated.

MODE FOR CARRYING OUT THE INVENTION

Hereinafter, the present invention will be described in detail. For convenience of description, a formation direction of a film may be referred to as a mechanical axis direction, a vertical direction, a machine direction or an MD direction, and a direction perpendicular to the film formation direction and a thickness direction may be referred to as a transverse direction, a lateral direction, or a TD direction. In particular, in the present invention, the machine direction is defined as an X axis, the transverse direction is defined as a Y axis, and the thickness direction is defined as a Z axis. Various physical properties and the like described in the present specification are specifically measured by methods described in Examples.

[Thermal Adhesive Laminated Oriented Film]

A thermal adhesive laminated oriented film of the present invention includes a substrate layer comprising a resin composition, and a thermal adhesive layer provided on each of both surfaces of the substrate layer so as to be in direct contact therewith by coextrusion. The film is stretched and oriented in at least one direction of the X axis or the Y axis.

The specification of "provided so as to be in direct contact by coextrusion" in the present invention specifies the structure of an object by a producing method, but it is impossible or substantially impractical to directly specify the object by its structure or characteristics as follows.

It is apparent that adhesion at a laminated interface in the case of producing a three-layer laminated film by coextrusion is different from that in the case of thermally laminating other two layers on a previously produced substrate film, and thus the three-layer laminated film has a microstructural difference. That is, when molecules at the laminated interfaces are microstructurally viewed, it is considered that different states where components of the layers are diffused and infiltrated from each other are present, and thus the laminated interfaces have different adhesions. However, since the difference between the diffusion states is a degree difference, it is difficult to structurally specify the difference between the states.

When the birefringence indices of the two other layers are measured in the case where the layers are exactly the same, the birefringence indices of the two layers are the same in the case of coextrusion, but the birefringence indices of the two layers are slightly different in the case of thermal lamination later. However, this is limited to the case where the compositions and the like of the two layers are exactly the same, and when the two layers are slightly different, the difference cannot be specified.

Therefore, it is not possible to find words specifying a structure or characteristics relating to a difference from the conventional technique, and it is also impossible or impractical to analyze and specify such a structure or characteristics on the basis of measurement. Therefore, in the present invention, it is impossible or substantially impractical to directly specify the object by its structure or characteristics at the time of filing.

The term "stretched and oriented" is used to specify the orientation state of the film, and is an expression commonly used in the technical field of the present invention.

The thermal adhesive laminated oriented film of the present invention includes, for example, a thermal adhesive layer, a substrate layer, and a thermal adhesive layer, but a protective film, a release film, or a cover film or the like may be further provided on at least one outermost surface. An adherend may be provided to be thermally bonded to one surface in advance.

Hereinafter, the configuration of the thermal adhesive laminated oriented film of the present invention will be described.

[Substrate Layer]

A thermoplastic resin contained in the resin composition constituting the substrate layer can be selected according to characteristics required for the substrate layer in the intended application, but in order to have the durability of the substrate layer itself in a severe moist-heat environment, it is preferable that the thermoplastic resin does not have a functional group that serves as a reaction point of water molecules and has a high melting point for withstanding heat during bonding and heat due to the environment.

In the present invention, from such a viewpoint, it is preferable to use a polyamide resin or a polymethylpentene resin as a main component of the resin composition. The resin composition preferably further contains a modified polyolefin resin from the viewpoint of improving dispersibility in these resins and adhesion to the thermal adhesive layer.

When the melting point of the thermoplastic resin as the main component of the resin composition is taken as TmS, the melting point of the resin constituting the thermal adhesive layer described later is taken as TmHS, and the difference therebetween is defined as $\Delta T$ (=TmS−TmHS), it is preferable to combine TmS and TmHS so that $\Delta T$ is in a range of 0 to 120° C., and it is more preferable that $\Delta T$ is in a range of 10 to 100° C. By setting $\Delta T$ to 0° C. or higher, for example, the substrate layer can be prevented from being first melted by heat applied during bonding. By setting $\Delta T$ to 120° C. or lower, it is possible to suppress the occurrence of lamination mottle to perform stable production without excessively increasing the difference in melt viscosity during melting by extruders and laminating in the thickness direction. From such a viewpoint, $\Delta T$ is more preferably 20° C. to 90° C., and particularly preferably 40° C. to 80° C.

In order to obtain a strength required as the substrate layer in providing the thermal adhesive layer, the thickness of the substrate layer may be 20 µm or more. The thickness of the substrate layer is preferably 25 µm or more, more preferably 35 µm or more, and still more preferably 45 µm or more. The thickness of the substrate layer is preferably 300 µm or less, more preferably 270 µm or less, and still more preferably 250 µm or less. In addition, the thickness of the substrate layer may be 150 µm or less or 130 µm or less.

[Polyamide Resin]

When the polyamide resin is formed into a stretched oriented film, the strength of the substrate layer is improved as compared with polyolefin, and therefore the substrate layer has excellent transportability. Examples of the polyamide resin include aliphatic polyamide resins, aromatic polyamide resins, and copolymers or blends thereof.

Such a polyamide resin is not particularly limited as long as the polyamide resin is a polymer having an amide bond (—NHCO—) in its main chain, and examples thereof include polyamide resins such as polyamide 6 (NY6), polyamide 66 (NY66), polyamide 46 (NY46), polyamide 11 (NY11), polyamide 12 (NY12), polyamide 610 (NY610), polyamide 612 (NY612), polymethaxylylene adipamide (MXD6), a hexamethylenediamine-terephthalic acid polymer (6T), a polymer of hexamethylenediamine-terephthalic acid and adipic acid (66T), a copolymer of hexamethylenediamine-terephthalic acid and ε-caprolactam (6T/6), a trimethylhexamethylenediamine-terephthalic acid polymer (TMD-T), a copolymer of metaxylylene diamine with adipic acid and isophthalic acid (MXD-6/I), a copolymer of trihexamethylenediamine with terephthalic acid and ε-caprolactam (TMD-T/6), and a copolymer of diaminodicyclohexylenemethane (CA) with isophthalic acid and lauryl lactam.

Among them, aliphatic polyamide resins such as polyamide 6 (NY6), polyamide 66 (NY66), and polyamide 610 (NY610) are preferable from the viewpoint of easily adjusting $\Delta T$ to a preferable range, hardly causing a viscosity difference when a thermal adhesive polyolefin is provided so as to be in direct contact, and not causing lamination mottle.

The polyamide resin preferably has a relative viscosity of 2.4 to 3.2 as measured in 96% sulfuric acid. As a result, when the polyamide resin is melt-mixed with the modified polyolefin resin, the viscosity of the mixture is likely to be favorable when a sheet-shaped product is obtained by coextrusion.

The content of the polyamide resin is preferably 60 to 99.9% by mass, more preferably 65 to 95% by mass, still more preferably 70 to 90% by mass, and most preferably 70 to 85% by mass in the resin composition constituting the substrate layer. When the content is within such a range, a sufficient mechanical strength is easily obtained, and from the relationship with the modified polyolefin in volume ratio, sufficient adhesion is easily secured using the polyamide resin as a matrix.

[Polymethylpentene Resin]

Examples of the polymethylpentene resin include a homopolymer of polymethylpentene, a copolymerized polyolefin containing 50 mol % or more of methylpentene as a monomer, and a mixture thereof. Examples of the monomer to be copolymerized include methylene, ethylene, propylene, and butylene.

Since the TmS of the polymethylpentene resin is improved as compared with general polypropylene, $\Delta T$ is easily secured, but since the polymethylpentene resin has low surface energy, the polymethylpentene resin has low affinity with the thermal adhesive layer, which makes difficult to increase adhesion. Therefore, it is preferable to mix the polymethylpentene resin with the modified polyolefin resin as in the case of the polyamide resin.

The content of the polymethylpentene resin is preferably 60 to 99.9% by mass, more preferably 65 to 95% by mass, still more preferably 70 to 90% by mass, and most preferably 70 to 85% by mass in the resin composition constituting the substrate layer. When the content is within such a range, the effect of improving heat resistance by polymethylpentene is easily obtained, and from the relationship with the modified polyolefin in volume ratio, sufficient adhesion is easily secured using the polymethylpentene resin as a matrix.

[Modified Polyolefin Resin]

The polyolefin is excellent in that it does not have a functional group that serves as a reaction point of water molecules, and the thermal adhesive layer is composed of a modified polyolefin. Therefore, high affinity with the layer, and excellent adhesion in a coextrusion method are provided. By using the modified polyolefin resin, dispersibility in the polyamide resin or the polymethylpentene resin is improved.

Examples of the modified polyolefin resin include those obtained by modifying the following polyolefin resins. In the present specification, the term "modified" refers to one containing a constituent unit different from a constituent unit such as a polyolefin in the same molecule. Examples of the polyolefin resin to be modified include olefin-based resins such as high density polyethylene, low density polyethylene, ultra-high molecular weight polyethylene, linear low density polyethylene, polypropylene, poly(1-butene), and poly(4-methylpentene). Another examples thereof include a blend of these polyolefin-based resins or a copolymer containing these polyolefin-based resins as a constituent component. Among these polyolefin-based resins, polypropylene is particularly preferable.

In particular, when the modified polyolefin resin is mixed with the polyamide resin by melt kneading, the modified polyolefin resin preferably has a functional group that reacts with an end group and/or a main chain amide group of the polyamide resin. Specifically, the modified polyolefin resin is preferably a modified polyolefin resin having a carboxylic acid group, an acid anhydride group, an epoxy group, an oxazoline group, an amino group, or an isocyanate group or the like, and more preferably has an acid anhydride group. When the modified polyolefin resin is mixed with the polymethylpentene resin, the same modified polyolefin resin can be used, but it is preferable to use a maleic acid-modified polypropylene resin from the viewpoint of compatibility and the like. As a modification method, graft modification or copolymerization can be used.

Specific examples of the modified polyolefin resin include maleic acid anhydride-modified polyethylene, maleic acid anhydride-modified polypropylene, an ethylene/acrylic acid copolymer, an ethylene/methacrylic acid copolymer, ones wherein a part of or all of the carboxylic acid moiety/moieties in the above copolymer is/are made into a salt with sodium, lithium, potassium, zinc or calcium, an ethylene/methyl acrylate copolymer, an ethylene/ethyl acrylate copolymer, an ethylene/methyl methacrylate copolymer, an ethylene/ethyl methacrylate copolymer, an ethylene/ethyl acrylate-g-maleic acid anhydride copolymer (here, "-g-" stands for graft; hereinafter, it stands for the same), an ethylene/methyl methacrylate-g-maleic acid anhydride copolymer, an ethylene/propylene-g-maleic acid anhydride copolymer, an ethylene/butene-1-g-maleic acid anhydride copolymer, an ethylene/propylene/1,4-hexadiene-g-maleic acid anhydride copolymer, an ethylene/propylene/dicyclopentadiene-g-maleic acid anhydride copolymer, an ethylene/propylene/2,5-norbornadiene-g-maleic acid anhydride copolymer, a hydrogenated styrene/butadiene/styrene-g-maleic acid anhydride copolymer, and a hydrogenated styrene/isoprene/styrene-g-maleic acid anhydride copolymer. Among them, maleic acid-modified polypropylene or an ethylene-propylene copolymer or the like is particularly preferable.

The acid value of the modified polypropylene is preferably 1.0 to 3.5 mgKOH/g, and more preferably 1.5 to 3.0 mgKOH/g from the viewpoint of dispersibility in the polyamide resin.

The content of the modified polyolefin resin can be appropriately adjusted for the purpose of increasing the affinity with the thermal adhesive layer or decreasing the moisture percentage of the substrate layer, but is preferably 0.1 to 40% by mass, more preferably 5 to 35% by mass, still more preferably 10 to 35% by mass, and yet still more preferably 15 to 35% by mass in the resin composition constituting the substrate layer.

[Other Optional Components of Substrate Layer]

The resin composition constituting the substrate layer may contain other resin components compatible with the polyamide resin and/or the polymethylpentene resin as long as the object of the present invention is not impaired.

The resin composition may contain an appropriate filler as necessary for improvement in lubricity, and the like as long as the object of the present invention is not impaired. As the filler, those conventionally known as a lubricity imparting agent for a film or a sheet can be used. Examples thereof include calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles, and crosslinked silicon resin particles. Furthermore, a coloring agent, an anti-static agent, an antioxidant, an organic lubricant, and a catalyst and the like can also be appropriately added to the substrate layer.

Examples of the other optional components include various additives conventionally used for the polyamide resin, the polymethylpentene resin, and the modified polyolefin resin. Examples of the additives include a stabilizer, an impact improver, a flame retardant, a release agent, a sliding improver, a coloring agent, a plasticizer, and a crystal nucleating agent. The additives may contain a component that reacts with the end group of the polyamide resin.

The other optional component can be used, for example, in an amount of 0.001 to 10% by mass in the resin composition.

[Thermal Adhesive Layer]

The thermal adhesive layer contains a thermal adhesive polyolefin resin in order that the thermal adhesive layer also needs moist-heat durability and has an adhesive force to an adherend. The thermal adhesive layer is provided on each of both surfaces of the substrate layer as described above. In the present specification, the term "thermal adhesive" refers to a property capable of adhering to an adherend by heating, and preferably refers to a property capable of adhering to SUS316 which is a metal by heating.

The thermal adhesive layers provided on both surfaces may have the same composition or different compositions, but for example, when adherends made of the same material are thermally bonded to each other, it is preferable to provide the thermal adhesive layers having the same composition on both the surfaces. The thicknesses of the thermal adhesive layers may be the same or different from each other, but in the case as described above, it is preferable to provide the thermal adhesive layers having the same thickness on both the surfaces.

The thickness of the thermal adhesive layer is preferably 100 μm or less. As for the adhesion between the thermal adhesive layer and the substrate layer provided by coextrusion, strong adhesion can be obtained, but for example, in the case of using an acid-modified polyolefin resin, an acid-modified portion has a functional group affected by moisture, and therefore when the thickness is unnecessarily increased, the thermal adhesive layer tends to be brittle and broken in a severe moist-heat environment. From such a viewpoint, the thickness of the thermal adhesive layer is preferably 90 μm or less, more preferably 80 μm or less, still more preferably 75 μm or less, and particularly preferably 60 μm or less. Since a mechanical relaxation function in the thickness direction is weakened as the thermal adhesive layer even if the thickness of the thermal adhesive layer is too thin, the thickness is preferably, for example, 10 μm or more, more preferably 15μ or more, and particularly preferably 20 μm or more.

The thermal adhesive layer is provided so as to be in direct contact with each of both surfaces of the substrate layer by coextrusion, and therefore the states of the laminated interfaces of both the surfaces of the substrate layer can be the same. As a result, when the thermal adhesive layers having the same composition are provided, a difference in birefringence index between the thermal adhesive layers on both the surfaces is 0.0001 or less, and such a state is preferable in terms of improving the adhesion of the laminated interfaces of both the surfaces.

[Thermal Adhesive Polyolefin Resin]

As a thermal adhesive polyolefin resin, an unmodified polyolefin-based resin can be used, but a modified polyolefin is preferable, and a modified polyolefin containing polypropylene is particularly preferable.

Examples of the unmodified polyolefin-based resin include homopolymers and copolymers of an olefin having 2 to 8 carbon atoms, and copolymers of an olefin having 2 to 8 carbon atoms and other monomers. Specifically, for example, polyethylenes such as high density polyethylene (HDPE), low density polyethylene (LDPE), and a linear low density polyethylene resin, polypropylene, polyisobutylene, poly(1-butene), poly(4-methylpentene), polyvinylcyclohexane, polystyrene, poly(p-methylstyrene), poly($\alpha$-methylstyrene), an ethylene-propylene block copolymer, an ethylene-propylene random copolymer, an ethylene-butene-1 copolymer, an ethylene-4-methyl-1-pentene copolymer, an ethylene-butene-propylene terpolymer, an ethylene-propylene diene rubber, an $\alpha$-olefin copolymer such as an ethylene-hexene copolymer, an ethylene-vinyl acetate copolymer, an ethylene-acrylic acid copolymer, an ethylene-methyl methacrylate copolymer, an ethylene-vinyl acetate-methyl methacrylate copolymer, a polybutadiene-styrene copolymer, a polybutadiene-maleic anhydride copolymer and an ionomer resin. Furthermore, chlorinated polyolefins obtained by chlorinating these polyolefins can also be used.

As described above, it is possible to use various types of thermal adhesive polyolefin resins, and it is particularly preferable to use a modified polyolefin resin obtained by introducing various functional groups, for example, functional groups such as a carboxyl group and a hydroxyl group, into a polyolefin resin.

Furthermore, among these modified polyolefin resins, a modified polyolefin resin having an acid value of 1 to 200 mgKOH/g (also referred to as an acid-modified polyolefin resin) and/or a modified polyolefin resin having a hydroxyl value of 1 to 200 mgKOH/g (also referred to as a hydroxyl group-modified polyolefin resin) can be used because adhesion to a metal layer is further improved and electrolyte resistance is excellent.

An acid-modified polyolefin resin is a polyolefin resin having a carboxyl group or a carboxylic anhydride group in the molecule, and is synthesized by modifying a polyolefin with an unsaturated carboxylic acid or a derivative thereof. As this modification method, graft modification or copolymerization can be used.

The acid-modified polyolefin resin is a graft-modified polyolefin obtained by graft-modifying or copolymerizing at least one polymerizable ethylenically unsaturated carboxylic acid or a derivative thereof with a pre-modification polyolefin resin.

Examples of the pre-modification polyolefin resin include the above-mentioned polyolefin resins, and among them, a homopolymer of propylene, a copolymer of propylene and $\alpha$-olefin, a homopolymer of ethylene, and a copolymer of ethylene and $\alpha$-olefin, and the like are preferable. These can be used alone or in combination of two or more.

Examples of the acid-modified polyolefin resin include maleic anhydride-modified polypropylene, an ethylene-(meth)acrylic acid copolymer, an ethylene-acrylic acid ester-maleic anhydride terpolymer, or an ethylene-methacrylic acid ester-maleic anhydride terpolymer.

Specifically, the acid-modified polyolefin resin is commercially available as "MODIC" manufactured by Mitsubishi Chemical Corporation, "ADMER" and "UNISTOLE" manufactured by Mitsui Chemicals, Inc., "TOYO TAC" manufactured by Toyobo Co., Ltd., "UMEX" manufactured by Sanyo Chemical, Ltd., "REXPEARL EEA" and "REXPEARL ET" manufactured by Japan Polyethylene Corporation, "PRIMACOL" manufactured by Dow Chemical, "NUCLEL" manufactured by Du Pont Mitsui Polychemicals Co., Ltd., and "BONDINE" manufactured by Arkema.

A hydroxyl group-modified polyolefin resin is a polyolefin resin having a hydroxyl group in the molecule, and is synthesized by graft-modifying or copolymerizing a polyolefin with a hydroxyl group-containing (meth)acrylic acid ester or a hydroxyl group-containing vinyl ether described later. Examples of the hydroxyl group-containing (meth)acrylic acid ester include hydroxyethyl (meth)acrylate; hydroxypropyl (meth)acrylate, glycerol (meth)acrylate; lactone-modified hydroxyethyl (meth)acrylate, polyethylene glycol (meth)acrylate, polypropylene glycol (meth)acrylate, and examples of the hydroxyl group-containing vinyl ether include 2-hydroxyethyl vinyl ether, diethylene glycol monovinyl ether, and 4-hydroxybutyl vinyl ether.

It is particularly preferable that the thermal adhesive polyolefin resin is obtained by modifying a mixture of a plurality of polyolefins having a melting peak temperature of 100° C. to 165° C. as measured by DSC with an acid anhydride, has an acid anhydride content of 0.1 to 3% by mass and an MFR of 1 to 30 g/10 min as measured under a load of 2.16 kg at 230° C., and an extracted amount of a low-molecular-weight component having a number average molecular weight of 1000 or less by acetone is less than 1% by mass.

[Other Optional Components of Thermal Adhesive Layer]

The thermal adhesive layer can contain other resin components compatible with the thermal adhesive polyolefin resin as long as the object of the present invention is not impaired.

The thermal adhesive layer can be made of only a resin, but a stabilizer such as a tackifier, an anti-static agent, an antioxidant, a metal deactivator, a dehydrating agent, or an antacid adsorbent, or an additive such as a cross-linking agent, a chain transfer agent, a nucleating agent, a lubricant, a plasticizer, a filler, a reinforcing material, a pigment, a dye, or a flame retardant may be added to the thermal adhesive layer within a range in which the effect of the present invention is not impaired.

[Characteristics of Thermal Adhesive Laminated Oriented Film]

The thermal adhesive laminated oriented film of the present invention preferably has a thermal deformation rate at 150° C. of 4% or less in both directions of the X axis and the Y axis. When the thermal deformation rate at 150° C. is 4% or less, the bonded state during thermal bonding is likely to be good. From such a viewpoint, the thermal deformation rate at 150° C. is more preferably 3% or less, and still more preferably 2.5% or less. The thermal deformation rate at 150° C. is preferably as small as possible, and the lower limit value of the thermal deformation rate at 150° C. is most preferably 0%, but is also preferable in a range of 1% or more.

The storage elastic modulus at 150° C. is preferably 50 MPa or more in at least one direction of the X axis or the Y axis, and the storage elastic modulus at 150° C. is more preferably 50 MPa or more in both directions of the X axis and the Y axis. When the storage elastic modulus at 150° C. is 50 MPa or more, the amount of deformation due to a stress during thermal bonding decreases, and the bonded state also tends to be favorable. From such a viewpoint, the storage elastic modulus at 150° C. is preferably 70 MPa or more, and more preferably 100 MPa or more. The storage elastic modulus at 150° C. is preferably as large as possible, but the practical upper limit is about 500 MPa.

The breaking strength at room temperature (25° C.) is preferably 50 MPa or more in at least one direction of the X axis or the Y axis, and the breaking strength is more preferably 50 MPa or more in both directions of the X axis and the Y axis. When the breaking strength is 50 MPa or more, the handleability during thermal bonding is improved, and the breakage at a lamination interface also tends to hardly occur. From such a viewpoint, the breaking strength is preferably 70 MPa or more, and more preferably 100 MPa or more. The breaking strength is preferably as high as possible, but the practical upper limit is about 500 MPa.

In at least one of the X axis and the Y axis, the breaking elongation retention rate after treatment with 2 atm saturated steam at 121° C. for 200 hours is preferably 50% or more, and in both directions of the X axis and the Y axis, the breaking elongation retention rate is more preferably 50% or more. When the breaking elongation retention rate after treatment with 2 atm saturated steam at 121° C. for 200 hours is 50% or more, sufficient durability can be exhibited even in a moist-heat environment more severe than that of the conventional one.

[Method for Producing Thermal Adhesive Laminated Oriented Film]

Hereinafter, the case where the polyamide resin is used as a main component of the resin constituting the substrate layer will be described. When the polymethylpentene resin is used, the substrate layer may be formed with reference to the following.

The thermal adhesive laminated oriented film of the present invention can be produced by, for example, kneading of materials constituting layers, coextrusion of a kneaded product, and molding, stretching, and heat treatment of an unstretched laminated body, and the like.

A method for mixing and kneading the polyamide resin, the modified polyolefin resin, and other optional components is not particularly limited, but for example, a single screw extruder, a twin screw extruder, a pressure kneader, or a Banbury mixer or the like can be used. Among these, a twin screw extruder is particularly preferably used. The operating conditions and the like of the twin screw extruder differ depending on various factors such as the type of the polyamide resin, and the type and amount of each of the components, and are not unambiguously determined. For example, the operating temperature may be set at the melting point Tm of the polyamide resin which is a thermoplastic resin as a main component+about 25° C. In the screw configuration of the extruder, kneading discs having excellent kneading are preferably incorporated at several positions.

The resin composition constituting the substrate layer is melt-extruded into a sheet by coextrusion together with the thermal adhesive layer, and cooled and solidified by a casting drum to obtain an unstretched laminated film. The unstretched laminated film is stretched in at least one direction of the X axis or the Y axis, and is preferably biaxially stretched.

When the unstretched laminated film is biaxially stretched, the unstretched laminated film is stretched at Tg to (Tg+100)° C. so that the total magnification of once or twice or more in the machine direction (X axis) is 2 to 6 times, and stretched at Tg+20 to (Tg+100)° C. so that the total magnification of once or twice or more in the transverse direction (Y axis) is 3 to 7 times. Here, Tg represents the glass transition temperature of the thermoplastic resin as a main component.

The thermal adhesive laminated oriented film can be obtained by further performing heat treatment at a Tm-60 to Tm-5° C. for 1 to 60 seconds as necessary, and further performing reheat treatment at a temperature lower than the heat treatment temperature by 10 to 20° C. while shrinking by 0 to 20% in the transverse direction as necessary. The stretching may be sequential biaxial stretching or simultaneous biaxial stretching, and the stretching order may be lateral-vertical.

The present invention is characterized in that the thermal adhesive layer is formed by coextrusion together with the substrate layer. In the conventional methods, the thermal adhesive layer is provided by a dry lamination method or a wet lamination method or the like as a lamination method, and by an extrusion resin coating method, a molten resin coating method, or a coating liquid coating method or the like as a coating method. However, in these methods, it is necessary to laminate the thermal adhesive layer in accordance with the substrate layer having a specific width in the transverse direction. Therefore, it is necessary to provide the thermal adhesive layer in a separate step after producing the substrate layer once, and furthermore, due to width restriction, there are many restrictions on an area that can be produced per unit time.

In the present invention, when the resin is extruded by coextrusion in order to provide the thermal adhesive layer, it is preferable to melt and extrude the resin by appropriately adjusting the melting temperature in accordance with the viscosity of the substrate layer. The type and molecular weight of the polyolefin resin can be selected so that the melt viscosity of the thermal adhesive layer is appropriate.

The operating temperature (melting temperature) of an extruder for the thermal adhesive layer is preferably TmHS+20° C. to TmHS+120° C., and more preferably TmHS+50° C. to TmHS+100° C. with respect to the melting point TmHS of the polyolefin resin.

The discharge amount of the melt of the thermal adhesive layer from the extruder is appropriately determined according to the thickness ratio with respect to the substrate layer, the thickness of the laminated body, and the line speed and the like.

[Roll]

In a roll of the present invention, the thermal adhesive laminated oriented film as described above is wound in the machine direction. That is, the thermal adhesive laminated oriented film of the present invention is preferably produced continuously.

[Application]

The thermal adhesive laminated oriented film of the present invention can be used for thermally bonding various adherends. Examples of the adherend include various metals, various resins, fiber-reinforced resins including glass fibers and the like, and ceramics. Examples of the shape of the adherend include a sheet, a film, a flat plate, and a three-dimensional shape having a flat portion and a curved surface portion obtained by bending a flat surface.

Thermal bonding due to the thermal adhesive laminated oriented film is performed at a temperature equal to or higher than a temperature at which the thermal adhesive layer is softened. In the case of thermal bonding at a temperature at which the substrate layer is thermally deformed, an adherend having a more complicated surface shape can be thermally bonded.

EXAMPLES

The present invention will be more specifically described by reference to Examples and Comparative Examples. In the present invention, physical properties and the like were measured or evaluated by the following methods. Hereinafter, unless otherwise specified, "part" means "part by mass", and "%" means "% by mass".

(1) Film, Thickness of Each Layer

A film was cut using a microtome to obtain a cross section perpendicular to the surface of the film. The film having the cross section coated with a platinum-palladium alloy by sputtering was used as an observation sample. The cross section of the film was observed using a scanning electron microscope (S-510 model manufactured by Hitachi, Ltd.), and a photograph was taken at an appropriate magnification at which the total thickness of the film was one field of view. From this image, the thickness of each layer was measured using a scale. Three cross-section samples prepared independently were measured, and the average value thereof was taken as the layer thickness of a laminated film.

(2) Difference in Birefringence Index Between Front and Back of Thermal Adhesive Layer When a machine direction is an X axis, a transverse direction is a Y axis, and a thickness direction is a Z axis, a sample piece is cut out and placed in a polarizing microscope so that an XY cross section (End direction) can be observed. A predetermined test plate was placed on the polarizing microscope. A birefringence index in the thickness direction of a thermal adhesive layer of each surface layer was measured from an observed phase difference and sample thickness using the Senarmont method. The difference was calculated as a difference in birefringence index between the front and back of a thermal adhesive layer.

(3) Difference in Melting Point Between Front and Back of Thermal Adhesive Layer The melting point of the thermal adhesive layer constituting the outermost layer of the sample piece was measured at a temperature rising rate of 10° C./min by DSC (Q100 manufactured by TA Instruments) by sampling 10 mg from each surface. An endothermic peak indicating the melting point was defined as the melting point, and the absolute value of the difference between the front and the back was calculated.

(4) Breaking Strength

A sample was cut out into a size of 10 mm in width and 100 mm in length, and a strength at a breaking point was measured as a breaking strength at room temperature (25° C.) in accordance with JIS-K7127 using a tensile tester (Tensilon UCT-100 manufactured by Orientec Co., Ltd.).

(5) Thermal Deformation Rate at 150° C.

When the machine direction was the X axis, the transverse direction was the Y axis, and the thickness direction was the Z axis, sampling was performed in 200 mm×200 mm of a sample XY plane to create marks (distance between marks: 100 mm). Thereafter, treatment was performed in a thermostatic bath at 150° C. for 30 seconds in a state where tension was not applied. The distance between marks was measured, and a thermal deformation rate at 150° C. was calculated from a change in the distance between marks based on the distance between marks before heat treatment.

(6) Storage Elastic Modulus at 150° C.

When the machine direction was the X axis, the transverse direction was the Y axis, and the thickness direction was the Z axis, sampling was performed at a length of 40 mm in each of an X direction and a Y direction (width: 5 mm). A storage elastic modulus was measured while the temperature was raised from room temperature to 180° C. at 2° C./min, using a dynamic viscoelasticity measuring device (DMA 8000 manufactured by PerkinElmer), at a distance between chucks of 10 mm, a displacement of 0.01 mm, and a frequency of 1 Hz, and a value at 150° C. was read.

(7) Adhesion (7-1) Interface 1: Thermal Adhesive Layer-Substrate Layer

A sample was cut into a size of 25 mm in width and 150 mm in length, and an end portion of the thermal adhesive layer whose adhesion should be measured was peeled off from a substrate layer to prepare a peeling start portion. Peeling was performed at 180O at a peeling rate of 100 mm/min according to JIS-C2151 using a tensile tester (Tensilon UCT-100 manufactured by Orientec Co., Ltd.). Five measurements were performed, and the average value of the maximum values of the respective measurements was evaluated as a peel force according to the following criteria.

A: The peeling force is 15 N or more, or the adhesion is strong and the peeling end cannot be formed.
B: The peeling force is 5 N or more and less than 15 N.
C: The peeling force is less than 5 N.

(7-2) Interface 2: Thermal Adhesive Layer-Adherend

The adhesion of an interface 2 was evaluated using SUS316 and polypropylene sheets as adherends. A method for forming the interface 2 is as follows. As a sample piece, two SUS316 or polypropylene sheets cut out into 150 mm□ with a press machine were prepared, and an obtained thermal adhesive laminated oriented film was sandwiched therebetween. For positioning, a hole having a diameter of 5 mm was drilled at a predetermined position, and after confirming that no deviation was present, the sample piece was pressed at 160° C. and a pressure of 5 MPa for 1 minute to perform bonding.

This molded sample was cut into a size of 10 mm in width and 100 mm in length, and the end portion of the adherend to be measured for adhesion was peeled off to prepare a peeling start portion, and peeling was performed at 180O at a peeling rate of 100 mm/min according to JIS-C2151 using a tensile tester (Tensilon UCT-100 manufactured by Orientec Co., Ltd.). Five measurements were performed, and the average value of the maximum values of the respective measurements was evaluated as a peel force according to the following criteria.

A: The peeling force is 10 N or more.
B: The peeling force is 3 N or more and less than 10 N.
C: The peeling force is less than 3 N.

Whether or not the dimensional change of the thermal adhesive laminated oriented film occurred during bonding, and the thermal adhesive laminated oriented film protruded from the SUS 316 or polypropylene sheet on both surfaces, or the size was shrunk, whereby a deviation in positioning boring was observed was evaluated according to the following criteria as the possibility of bonding.

◯: No deviation in boring and good bonding
X: Deviation in boring and poor bonding (7-3) Adhesion in Moist-Heat Environment (121° C.×48 Hours)

The same procedures as in the above (7-2) were carried out to perform evaluation according to the following criteria except that the SUS 316 adherend sample prepared in the above (7-2) immersed in water at 121° C. for 48 hours, then left at room temperature for 24 hours, and dried was used.

A: The peeling force is 10 N or more.
B: The peeling force is 3 N or more and less than 10 N.
C: The peeling force is less than 3 N.

(8) Relative Viscosity of Polyamide Resin

Measurement was performed using an Ubbelohde's viscometer at 25° C. in a 96% by mass sulfuric acid solution at a polyamide resin concentration of 1 g/dl.

(9) Acid Value of Modified Polyolefin Resin

The acid value (mgKOH/g) of the modified polyolefin resin refers to the amount of KOH required to neutralize 1 g of an acid-modified polyolefin, and was measured in accordance with the test method of JIS K0070 (1992). Specifically, 1 g of an acid-modified polyolefin was dissolved in 100 g of xylene whose temperature had been adjusted to 100° C., and then titration was performed with a 0.1 mol/L potassium hydroxide ethanol solution [trade name: "0.1 mol/L ethanolic potassium hydroxide solution", manufactured by Wako Pure Chemical Industries, Ltd.] using phenolphthalein as an indicator at the same temperature. At this time, the amount of the potassium hydroxide required for the titration was converted into mg to calculate an acid value (mgKOH/g).

(10) Melting Peak Temperature of Polyolefin

The melting peak temperature of the polyolefin was measured according to the above (3) Difference in Melting Point Between Front and Back of Thermal Adhesive Layer.

(11) Melt Flow Rate (MFR)

Using an extruding type plastometer specified in JIS K6760, measurement was performed according to a method specified in JIS K7210 in a state where a load of 2.16 kg was applied at 230° C. (unit: g/10 min).

(12) Extracted Amount of Low Molecular Weight Component

Using acetone evaporated and cooled in a warm water bath at 90° C., Soxhlet extraction was performed for 2 hours to extract a dissolved component, and using the obtained solution, a low molecular weight component having a number average molecular weight of 1000 or less was confirmed by an apparatus (e2695 manufactured by Waters). The extracted amount (% by mass) of the low molecular weight component was determined from the mass of the sample.

Example 1

A resin A was used as a resin composition constituting a substrate layer. The resin A contains 70% by mass of nylon 6 (PA6) (T-803 manufactured by Toyobo Co., Ltd., relative viscosity: 2.7) and 30% by mass of modified polypropylene (PO) (acid value: 2.8 mgKOH/g, MMP-006 manufactured by Prime Polymer Co., Ltd.). The resin A was charged into an extruder, and melt-kneaded at a melting temperature of 260° C. While the melt-kneaded resin A was extruded through a die slit, a thermal adhesive modified polyolefin resin (TOYO TAC M100, acid anhydride content: 1% by mass, melting peak temperatures: 110° C. and 126° C., MFR: 10 g/10 min, extracted amount of low molecular weight component: 0.5% by mass) was melt-kneaded at a melting temperature of 230° C. with an extruder, and coextruded on both surfaces so as to be in direct contact with the substrate layer through a die slit, and cooled and solidified on a casting drum set at a surface temperature of 25° C. to prepare an unstretched film. At this time, coextrusion was performed with the discharge amount controlled so that the thickness constituent ratio of the unstretched film was 1:3:1.

The unstretched film was guided to a group of rolls heated to 70° C., stretched by a factor of 3.0 times in a machine direction, and cooled by a group of rolls at 25° C. Subsequently, the film was guided into a tenter while both ends of the film were held by clips, where the film was stretched by a factor of 4.0 times in a transverse direction in an atmosphere heated to 90° C. Thereafter, while heat fixation was performed at 180° C. in the tenter, the film was relaxed by 5% in the transverse direction, and then uniformly cooled slowly to room temperature to obtain a biaxially stretched film having a thickness of 125 μm, and the film was wound into a roll to obtain a roll of a thermal adhesive laminated oriented film. The characteristics of the obtained thermal adhesive laminated oriented film are summarized in Table 1.

Example 2

A resin B containing 70% by mass of polymethylpentene (TPX) (DX845 manufactured by Mitsui Chemicals, Inc.) and 30% by mass of modified polypropylene (the same as that contained in the resin A) was used as a resin composition constituting a substrate layer. The resin B was charged into an extruder, and melt-kneaded at a melting temperature of 260° C. While the melt-kneaded resin B was extruded on both surfaces so as to be in direct contact with the substrate layer through a die slit, a thermal adhesive modified polyolefin resin (TOYO TAC M100 manufactured by Toyobo Co., Ltd.) was charged into an extruder, and melt-kneaded at a melting temperature of 230° C., and coextruded through a die slit, and cooled and solidified on a casting drum set at a surface temperature of 25° C. to prepare an unstretched film. At this time, coextrusion was performed with the discharge amount controlled so that the thickness constituent ratio of the unstretched film was 1:3:1.

The unstretched film was guided to a group of rolls heated to 100° C., stretched by a factor of 3.5 times in a machine direction, and cooled by a group of rolls at 25° C. Subsequently, the film was guided into a tenter while both ends of the film were held by clips, where the film was stretched by a factor of 4.0 times in a transverse direction in an atmosphere heated to 110° C. Thereafter, while heat fixation was performed at 200° C. in the tenter, the film was relaxed by 5% in the transverse direction, and then uniformly cooled slowly to room temperature to obtain a biaxially stretched film having a thickness of 125 μm, and the film was wound into a roll to obtain a roll of a thermal adhesive laminated oriented film. The characteristics of the obtained thermal adhesive laminated oriented film are summarized in Table 1.

Example 3

A roll of a thermal adhesive laminated oriented film was obtained in the same manner as in Example 1 except that the discharge amounts of the resin A and the modified polyolefin resin were changed to obtain a biaxially stretched film having a thickness of 250 μm in Example 1. The characteristics of the obtained thermal adhesive laminated oriented film are summarized in Table 1.

Example 4

A roll of a thermal adhesive laminated oriented film was obtained in the same manner as in Example 2 except that the discharge amounts of the resin B and the modified polyolefin resin were changed to obtain a biaxially stretched film having a thickness of 250 µm in Example 2. The characteristics of the obtained thermal adhesive laminated oriented film are summarized in Table 1.

Example 5

A roll of a thermal adhesive laminated oriented film was obtained in the same manner as in Example 1 except that the content of each resin contained in the resin A was changed as shown in Table 1 in Example 1. The characteristics of the obtained thermal adhesive laminated oriented film are summarized in Table 1.

Example 6

A roll of a thermal adhesive laminated oriented film was obtained in the same manner as in Example 1 except that nylon 6 contained in the resin A was changed to nylon 610 (PA610) (HIPROLON7ONN manufactured by Arkema, relative viscosity: 2.7) in Example 1. The characteristics of the obtained thermal adhesive laminated oriented film are summarized in Table 1.

Example 7

A roll of a thermal adhesive laminated oriented film was obtained in the same manner as in Example 1 except that the thermal adhesive modified polyolefin resin was changed to TOYO TAC M312 (acid anhydride content: 1.0% by mass, melting peak temperatures: 110° C. and 130° C., MFR: 12 g/10 min, extracted amount of low molecular weight component: 0.8% by mass) in Example 1. The characteristics of the obtained thermal adhesive laminated oriented film are summarized in Table 1.

Example 8

A roll of a thermal adhesive laminated oriented film was obtained in the same manner as in Example 1 except that the modified polyolefin resin contained in the resin A was changed to TOYO TAC M-100 in Example 1. The characteristics of the obtained thermal adhesive laminated oriented film are summarized in Table 1.

Comparative Example 1

A thermal adhesive laminated oriented film having the same layer structure as that of the thermal adhesive laminated oriented film obtained in Example 1 was prepared using the following method.

That is, a resin A was charged into an extruder, and melt-kneaded at a melting temperature of 260° C. While the melt-kneaded resin A was extruded through a die slit, the resin A was cooled and solidified on a casting drum set at a surface temperature of 25° C. to prepare an unstretched film. The unstretched film was guided to a group of rolls heated to 70° C., stretched by a factor of 3.0 times in a machine direction, and cooled by a group of rolls at 25° C. Subsequently, the film was guided into a tenter while both ends of the film were held by clips, where the film was stretched by a factor of 4.0 times in a transverse direction in an atmosphere heated to 90° C. Thereafter, while heat fixation was performed at 180° C. in the tenter, the film was relaxed by 5% in the transverse direction, and then uniformly cooled slowly to room temperature to obtain a biaxially stretched film having a thickness of 75 µm, and the film was wound into a roll to obtain a roll A1 of a film including only a substrate layer.

A thermal adhesive modified polyolefin resin (TOYO TAC M100 manufactured by Toyobo Co., Ltd.) was charged into an extruder, and cooled and solidified on a casting drum set at a surface temperature of 25° C. to prepare a roll A2 of an unstretched film.

The roll A1 serving as a substrate layer was unwound, and the roll A2 was unwound so as to be bonded to one side. A heating roll wound with a Teflon tube was set to 160° C., and lamination was performed while nipping to prepare a single-sided bonded roll A3. Furthermore, the single-sided bonded roll A3 was unwound, and the roll A2 was unwound so as to be bonded to the substrate layer side. Similarly, lamination was performed while nipping to obtain a roll of a thermal adhesive laminated oriented film. The characteristics of the thermal adhesive laminated oriented film obtained by this method are summarized in Table 1.

Comparative Example 2

A resin A was charged into an extruder, and melt-kneaded at a melting temperature of 260° C. While the melt-kneaded resin A was extruded through a die slit, a thermal adhesive modified polyolefin resin (TOYO TAC M100 manufactured by Toyobo Co., Ltd.) was charged into an extruder, and melt-kneaded at a melting temperature of 230° C., and coextruded on one surface so as to be in direct contact with a substrate layer through a die slit, and cooled and solidified on a casting drum set at a surface temperature of 25° C. to prepare an unstretched film. At this time, extrusion was performed with the discharge amount controlled so that the thickness constituent ratio of the unstretched film was 1:3. The unstretched film was guided to a group of rolls heated to 70° C., stretched by a factor of 3.0 times in a machine direction, and cooled by a group of rolls at 25° C. Subsequently, the film was guided into a tenter while both ends of the film were held by clips, where the film was stretched by a factor of 4.0 times in a transverse direction in an atmosphere heated to 90° C. Thereafter, while heat fixation was performed at 180° C. in the tenter, the film was relaxed by 5% in the transverse direction, and then uniformly cooled slowly to room temperature to obtain a biaxially stretched film having a thickness of 100 µm, and the film was wound into a roll to obtain a single-sided bonded roll A4.

A thermal adhesive modified polyolefin resin (ADMER QE840 manufactured by Mitsui Chemicals, Inc.) was charged into an extruder, and cooled and solidified on a casting drum set at a surface temperature of 25° C. to prepare an unstretched film and an unstretched film roll A5.

The roll A4 was unwound, and the roll A5 was unwound so as to be bonded to the substrate layer side. A heating roll wound with a Teflon tube was set to 160° C., and lamination was performed while nipping to obtain a roll of a thermal adhesive laminated oriented film. The characteristics of the thermal adhesive laminated oriented film obtained by this method are summarized in Table 1.

Comparative Example 3

The resin B was charged into an extruder, and melt-kneaded at a melting temperature of 260° C. While the melt-kneaded resin B was extruded on both surfaces so as to be in direct contact with the substrate layer through a die slit, a thermal adhesive modified polyolefin resin (TOYO TAC M100 manufactured by Toyobo Co., Ltd.) was charged into an extruder, and melt-kneaded at a melting temperature of 230° C., and coextruded through a die slit, and cooled and solidified on a casting drum set at a surface temperature of 25° C. to prepare an unstretched film. At this time, coextrusion was performed with the discharge amount controlled so that the thickness constituent ratio of the unstretched film was 1:3:1 to obtain an unstretched film having a thickness of 125 µm and not subjected to stretching treatment, and the unstretched film was wound into a roll to obtain a roll of a thermal adhesive laminated oriented film. The characteristics of the obtained thermal adhesive laminated oriented film are summarized in Table 1.

Comparative Example 4

A resin C composed of polyethylene-2,6-naphthalate having an intrinsic viscosity of 0.60 dl/g (35° C., ortho-chlorophenol) was charged into an extruder, and melt-kneaded at a melting temperature of 300° C. While the melt-kneaded resin C was extruded through a die slit, the resin C was cooled and solidified on a casting drum set at a surface temperature of 60° C. to prepare an unstretched film. The unstretched film was guided to a group of rolls heated to 125° C., stretched by a factor of 3.5 times in a machine direction, and cooled by a group of rolls at 25° C. Subsequently, the film was guided into a tenter while both ends of the film were held by clips, where the film was stretched by a factor of 4.0 times in a transverse direction in an atmosphere heated to 145° C. Thereafter, while heat fixation was performed at 225° C. in the tenter, the film was relaxed by 5% in the transverse direction, and then uniformly cooled slowly to room temperature to obtain a biaxially stretched film having a thickness of 75 µm, and the film was wound into a roll to obtain a roll C1 of a film including only a substrate layer.

TOYO TAC (trade name: M100) manufactured by Toyobo Co., Ltd. was charged into an extruder, and cooled and solidified on a casting drum set at a surface temperature of 25° C. to prepare a roll A2 of an unstretched film.

The substrate layer roll C1 was unwound, and the roll A2 was unwound so as to be bonded to one side. A heating roll wound with a Teflon tube was set to 160° C., and lamination was performed while nipping to prepare a single-sided bonded roll C2.

Furthermore, the single-sided bonded roll C2 was unwound, and the roll A2 was unwound so as to be bonded to the substrate layer side. Similarly, lamination was performed while nipping to obtain a roll of a thermal adhesive laminated oriented film. The characteristics of the thermal adhesive laminated oriented film obtained by this method are summarized in Table 1.

Comparative Example 5

A roll of a thermal adhesive laminated oriented film was obtained in the same manner as in Example 1 except that a stretching ratio was 3.8 in a machine direction and 4.2 in a transverse direction and a relaxation ratio was lowered to 1% in Example 1. The characteristics of the obtained thermal adhesive laminated oriented film are summarized in Table 1.

Comparative Example 6

A roll of a thermal adhesive laminated oriented film was obtained in the same manner as in Example 1 except that a resin composed of 100% by mass of 6 nylon was used instead of the resin A in Example 1. The characteristics of the obtained thermal adhesive laminated oriented film are summarized in Table 1.

Comparative Example 7

A roll of a thermal adhesive laminated oriented film was obtained in the same manner as in Example 2 except that a resin composed of 100% by mass of polymethylpentene was used instead of the resin B in Example 2. The characteristics of the obtained thermal adhesive laminated oriented film are summarized in Table 1.

TABLE 1

| Thermal adhesive laminated oriented film | | Example 1 | Example 2 | Example 3 | Example 4 | Example 5 |
|---|---|---|---|---|---|---|
| Thermal adhesive layer | Resin type | M100 | M100 | M100 | M100 | M100 |
| Thermoplastic resin layer | Resin type | PA6/PO | TPX/PO | PA6/PO | TPX/PO | PA6/PO |
| | % BY MASS | 70/30 | 70/30 | 70/30 | 70/30 | 90/10 |
| Thermal adhesive layer | Resin type | M100 | M100 | M100 | M100 | M100 |
| Thickness (µm) | Thermal adhesive layer | 25 | 25 | 50 | 50 | 25 |
| | Substrate layer | 75 | 75 | 150 | 150 | 75 |
| | Laminated body | 125 | 125 | 250 | 250 | 125 |
| Substrate producing method | | Biaxially stretching | Biaxially stretching | Biaxially stretching | Biaxially stretching | Biaxially stretching |
| Thermal adhesive layer lamination method | | Coextrusion | Coextrusion | Coextrusion | Coextrusion | Coextrusion |
| Difference in refractive index between front and back of thermal adhesive layer | Δn | 0 | 0 | 0 | 0 | 0 |
| Difference in melting point between front and back of thermal adhesive layer | ΔTm | 0 | 0 | 0 | 0 | 0 |
| Breaking strength | X/MPa | 187 | 76 | 190 | 72 | 210 |
| | Y/MPa | 253 | 87 | 251 | 85 | 255 |
| Thermal determination rate at 150° C. | X/% | 1.1 | 2.3 | 1.5 | 2.2 | 1.2 |
| | Y/% | 1.3 | 2.6 | 2.0 | 2.5 | 1.5 |
| Storage elastic modulus at 150° C. | X/MPa | 313 | 81 | 313 | 81 | 723 |
| | Y/MPa | 322 | 85 | 322 | 85 | 754 |
| Adhesion | Interface 1 | A | A | A | A | A |
| | Interface 2 (metal) | A | A | A | A | A |

TABLE 1-continued

| | | | | | | |
|---|---|---|---|---|---|---|
| | Interface 2 (bonding) | ○ | ○ | ○ | ○ | ○ |
| | Interface 2 (pp sheet) | A | A | A | A | A |
| | Moist-heat durability | A | A | A | A | A |

| Thermal adhesive laminated oriented film | | Example 6 | Example 7 | Example 8 | Comparative Example 1 | Comparative Example 2 |
|---|---|---|---|---|---|---|
| Thermal adhesive layer | Resin type | M100 | M312 | M100 | M100 | M100 |
| Thermoplastic resin layer | Resin type | PA610/PO | PA6/PO | PA6/M100 | PA6/PO | PA6/PO |
| | % BY MASS | 70/30 | 70/30 | 70/30 | 70/30 | 70/30 |
| Thermal adhesive layer | Resin type | M100 | M312 | M100 | M100 | QE840 |
| Thickness (μm) | Thermal adhesive layer | 25 | 25 | 25 | 25 | 25 |
| | Substrate layer | 75 | 75 | 75 | 75 | 75 |
| | Laminated body | 125 | 125 | 125 | 125 | 125 |
| Substrate producing method | | Biaxially stretching | Biaxially stretching | Biaxially stretching | Biaxially stretching | Biaxially stretching |
| Thermal adhesive layer lamination method | | Coextrusion | Coextrusion | Coextrusion | Double-sided laminate | One-sided laminate |
| Difference in refractive index between front and back of thermal adhesive layer | Δn | 0 | 0 | 0 | 0.0002 | 0.002 |
| Difference in melting point between front and back of thermal adhesive layer | ΔTm | 0 | 0 | 0 | 0 | 20 |
| Breaking strength | X/MPa | 145 | 185 | 190 | 185 | 185 |
| | Y/MPa | 190 | 256 | 252 | 252 | 252 |
| Thermal determination rate at 150° C. | X/% | 1.7 | 1.0 | 1.0 | 1.2 | 1.2 |
| | Y/% | 1.9 | 1.4 | 1.2 | 1.3 | 1.3 |
| Storage elastic modulus at 150° C. | X/MPa | 210 | 347 | 320 | 311 | 311 |
| | Y/MPa | 214 | 379 | 341 | 319 | 319 |
| Adhesion | Interface 1 | A | A | A | B | B |
| | Interface 2 (metal) | A | A | A | A | B |
| | Interface 2 (bonding) | ○ | ○ | ○ | ○ | ○ |
| | Interface 2 (pp sheet) | A | A | A | A | A |
| | Moist-heat durability | A | A | A | A | C |

| Thermal adhesive laminated oriented film | | Comparative Example 3 | Comparative Example 4 | Comparative Example 5 | Comparative Example 6 | Comparative Example 7 |
|---|---|---|---|---|---|---|
| Thermal adhesive layer | Resin type | M100 | M100 | M100 | M100 | M100 |
| Thermoplastic resin layer | Resin type | TPX/PO | PEN | PA6/PO | PA6 | TPX |
| | % BY MASS | 70/30 | 100 | 70/30 | 100 | 100 |
| Thermal adhesive layer | Resin type | M100 | M100 | M100 | M100 | M100 |
| Thickness (μm) | Thermal adhesive layer | 25 | 50 | 25 | 25 | 25 |
| | Substrate layer | 75 | 150 | 75 | 75 | 75 |
| | Laminated body | 125 | 250 | 125 | 125 | 125 |
| Substrate producing method | | Unstretched | Biaxially stretching | Biaxially stretching | Biaxially stretching | Biaxially stretching |
| Thermal adhesive layer lamination method | | Coextrusion | Laminate | Coextrusion | Coextrusion | Coextrusion |
| Difference in refractive index between front and back of thermal adhesive layer | Δn | 0 | 0 | 0 | 0 | 0 |
| Difference in melting point between front and back of thermal adhesive layer | ΔTm | 0 | 0 | 0 | 0 | 0 |
| Breaking strength | X/MPa | 22 | 190 | 220 | 213 | 74 |
| | Y/MPa | 24 | 247 | 270 | 253 | 80 |
| Thermal determination rate at 150° C. | X/% | 0.4 | 0.3 | 4.1 | 1.5 | 2.3 |
| | Y/% | 0.5 | 0.5 | 5.7 | 1.3 | 2.5 |
| Storage elastic modulus at 150° C. | X/MPa | 1 | 750 | 523 | 756 | 78 |
| | Y/MPa | 1 | 762 | 650 | 791 | 90 |
| Adhesion | Interface 1 | B | C | A | B | Evaluation impossible |
| | Interface 2 (metal) | A | C | A | C | Evaluation impossible |
| | Interface 2 (bonding) | ○ | ○ | x | ○ | ○ |

TABLE 1-continued

| | | | | | |
|---|---|---|---|---|---|
| Interface 2 (pp sheet) | A | B | A | C | Evaluation impossible |
| Moist-heat durability | A | C | A | Evaluation impossible | Evaluation impossible |

As is apparent from Table 1, in Examples 1 to 8, the thermal adhesive laminated oriented films having sufficient mechanical properties, having high durability in a moist-heat environment and high adhesion at a lamination interface, and having a good bonded state during thermal bonding could be obtained.

Meanwhile, in Comparative Example 1 in which the thermal adhesive layer was thermally laminated on each of both surfaces of the biaxially stretched substrate layer, the adhesion at the interface with the substrate layer was insufficient. Also in Comparative Example 2 in which the thermal adhesive layer was thermally laminated on only one surface, the adhesion at the interface with the substrate layer was insufficient, and a residual stress was present only in the substrate layer and the adhesive layer on one side by laminating one surface, whereby the durability in a moist-heat environment was also poor.

Meanwhile, in Comparative Example 3 in which stretching was not performed after coextrusion, the mechanical properties were insufficient, and the adhesion at the lamination interface was also deteriorated. In Comparative Example 4 in which the thermal adhesive layer was thermally laminated directly using the polyester substrate, the durability in a moist-heat environment was poor, and the adhesion at the lamination interface was also deteriorated. In Comparative Example 5 in which the thermal deformation rate at 150° C. was more than 4%, the bonded state during thermal bonding was deteriorated.

Furthermore, in Comparative Examples 6 and 7 in which the substrate layer did not contain the modified polyolefin resin, the adhesion at the lamination interface was also deteriorated, and items in which the adhesion was significantly deteriorated and could not be evaluated were also present.

INDUSTRIAL APPLICABILITY

The thermal adhesive laminated oriented film of the present invention is highly industrially applicable because it does not cause delamination between layers with respect to various planar or film-shaped adherends such as a metal, glass, and a resin regardless of being reinforced with a fiber, has an excellent adhesive force, has strong durability even in severe durability evaluation, and can suppress bonding failure by maintaining the rigidity of the substrate layer that can withstand heat during bonding molding.

The invention claimed is:

1. A thermal adhesive laminated oriented film comprising:
a substrate layer comprising a resin composition containing 99.9 to 60% by mass of a polyamide resin or a polymethylpentene resin and 0.1 to 40% by mass of a modified polyolefin resin; and
a thermal adhesive layer containing a thermal adhesive polyolefin resin and provided on each of both surfaces of the substrate layer so as to be in direct contact therewith by coextrusion,
wherein the film, having a machine direction defined as an X axis, a transverse direction defined as a Y axis, and a thickness direction defined as a Z axis, is stretched and oriented in at least one direction of the X axis or the Y axis, and the film has a thermal deformation rate of 4% or less in both directions of the X axis and the Y axis when the film is treated in a thermostatic bath at 150° C. for 30 seconds.

2. The thermal adhesive laminated oriented film according to claim 1, wherein the film has a storage elastic modulus at 150° C. of 50 MPa or more and a breaking strength of 50 MPa or more in at least one direction of the X axis or the Y axis.

3. The thermal adhesive laminated oriented film according to claim 1, wherein the thermal adhesive layer provided on each of both the surfaces has a thickness of 10 μm or more and 100 μm or less, and a difference in birefringence index between the thermal adhesive layers on both the surfaces is 0.0001 or less.

4. The thermal adhesive laminated oriented film according to claim 1, wherein the film is oriented in two directions of the X axis and the Y axis by sequential or simultaneous biaxial stretching.

5. The thermal adhesive laminated oriented film according to claim 1, wherein the resin composition contains 85 to 65% by mass of the polyamide resin and 15 to 35% by mass of the modified polyolefin resin, the modified polyolefin resin is a modified polypropylene resin, the polyamide resin has a relative viscosity of 2.4 to 3.2 as measured in 96% sulfuric acid, and the modified polypropylene resin has an acid value of 1.0 to 3.5 mgKOH/g.

6. The thermal adhesive laminated oriented film according to claim 1, wherein the thermal adhesive polyolefin resin is obtained by modifying a mixture of a plurality of polyolefins having a melting peak temperature of 100° C. to 165° C. as measured by DSC with an acid anhydride, has an acid anhydride content of 0.1 to 3% by mass and an MFR of 1 to 30 g/10 min as measured under a load of 2.16 kg at 230° C., and an extracted amount of a low-molecular-weight component having a number average molecular weight of 1000 or less by acetone is less than 1% by mass.

7. The thermal adhesive laminated oriented film according to claim 1, wherein a thickness of the substrate layer is 20 μm or more and 300 μm or less.

8. The thermal adhesive laminated oriented film according to claim 1, wherein a thickness of the substrate layer is 20 μm or more and 300 μm or less, and a thickness of each of the thermal adhesive layers is 10 μm or more and 100 μm or less.

9. The thermal adhesive laminated oriented film according to claim 1, wherein the resin composition contains 99.9 to 60% by mass of the polyamide resin and the polyamide resin is an aliphatic polyamide resin.

10. The thermal adhesive laminated oriented film according to claim 1, wherein the resin composition contains 99.9 to 60% by mass of the polyamide resin, and the polyamide resin is at least one polyamide selected from the group consisting of polyamide 6, polyamide 66 and polyamide 610.

11. The thermal adhesive laminated oriented film according to claim 1, wherein the resin composition contains 99.9 to 60% by mass of the polymethylpentene resin.

12. The thermal adhesive laminated oriented film according to claim 1, wherein the thermal adhesive polyolefin resin comprises a carboxylic anhydride group.

13. The thermal adhesive laminated oriented film according to claim 1, wherein the thermal adhesive polyolefin resin has an acid value of 1 to 200 mgKOH/g.

14. The thermal adhesive laminated oriented film according to claim 1, wherein the thermal deformation rate at 150° C. is 1% or more in both directions of the X axis and the Y axis.

15. A roll obtained by winding the thermal adhesive laminated oriented film according to claim 1 in a machine direction.

\* \* \* \* \*